United States Patent [19]

Foster

[11] Patent Number: 5,279,102
[45] Date of Patent: Jan. 18, 1994

[54] CLEARING APPARATUS AND CARRIAGE FOR CLEARING APPARATUS

[75] Inventor: Thomas E. Foster, 1800 Loop 360 S., Austin, Tex. 78746

[73] Assignee: Thomas E. Foster, Austin, Tex.

[21] Appl. No.: 28,238

[22] Filed: Mar. 9, 1993

Related U.S. Application Data

[63] Continuation-in-part of Ser. No. 850,656, Mar. 12, 1992, abandoned.

[51] Int. Cl.[5] .......................................... A01D 34/68
[52] U.S. Cl. .................................. 56/12.7; 56/12.8; 56/17.2; 56/DIG. 9; 56/DIG. 18
[58] Field of Search ............... 56/12.7, 12.1, 12.8, 56/16.7, 17.2, 16.9, 17.5, 202, 400.14 DIG. 7, DIG. 18, 473.5; 30/276

[56] References Cited

U.S. PATENT DOCUMENTS

| | | | |
|---|---|---|---|
| 2,638,730 | 5/1953 | Davidson . | |
| 3,221,481 | 12/1965 | Mattson et al. . | |
| 3,788,049 | 1/1974 | Ehrlich | 56/16.9 |
| 3,977,078 | 8/1976 | Pittinger, Jr. | 30/276 |
| 4,009,560 | 3/1977 | Wells | 56/400.14 X |
| 4,182,100 | 1/1980 | Letter | 56/17.1 X |
| 4,224,784 | 9/1980 | Hansen et al. | 56/16.9 |
| 4,358,123 | 11/1982 | Richards | 280/47.13 R |
| 4,442,659 | 4/1984 | Enbusk | 56/12.7 |
| 4,512,143 | 4/1985 | Jimenez | 56/16.7 |
| 4,587,800 | 5/1986 | Jimenez | 56/16.9 |
| 4,624,321 | 11/1986 | Pinto | 172/15 |
| 4,679,385 | 7/1987 | Carmine | 56/16.9 |
| 4,688,376 | 8/1987 | Wolfe, Sr. | 56/16.7 |
| 4,703,613 | 11/1987 | Raymond | 56/12.7 |
| 4,704,849 | 11/1987 | Gilbert et al. | 56/17.5 |
| 4,712,363 | 12/1987 | Claborn | 56/16.7 |
| 4,756,147 | 7/1988 | Savell | 56/16.7 |
| 4,796,415 | 1/1989 | Moore | 56/16.9 |
| 4,802,327 | 2/1989 | Roberts | 56/15.2 |
| 4,829,755 | 5/1989 | Nance | 56/17.1 |
| 4,845,929 | 7/1989 | Kawasaki et al. | 56/17.5 |
| 4,891,931 | 1/1990 | Holland | 56/16.7 |
| 4,914,899 | 4/1990 | Carmine | 56/16.7 |
| 4,922,694 | 5/1990 | Emoto | 56/16.7 |
| 4,936,886 | 6/1990 | Quillen | 56/16.7 |
| 4,953,294 | 9/1990 | Dohse | 30/276 X |
| 4,981,012 | 1/1991 | Clabors | 56/16.9 |

OTHER PUBLICATIONS

Owners Manual by "Inertia Dynamics Corporation," idc 500 530, pp. 1-16 (Jun. 1991).

Primary Examiner—Terry Lee Melius
Attorney, Agent, or Firm—Arnold, White & Durkee

[57] ABSTRACT

A clearing apparatus which includes a clearing device for use in clearing operations, and a carriage for supporting the clearing device during use. The clearing device is of conventional type and has an elongated support tube, a clearing head mounted at one end of the support tube, and a motor mounted at the other end of the support tube. The carriage includes a frame, a single support wheel which is rotatably mounted on the frame to support the frame, and a guide handle for use in guiding the apparatus, and the frame has a mounting bracket which mounts the support tube on the frame so that the clearing apparatus will be supported proximate its center of gravity on the support wheel during use.

48 Claims, 6 Drawing Sheets

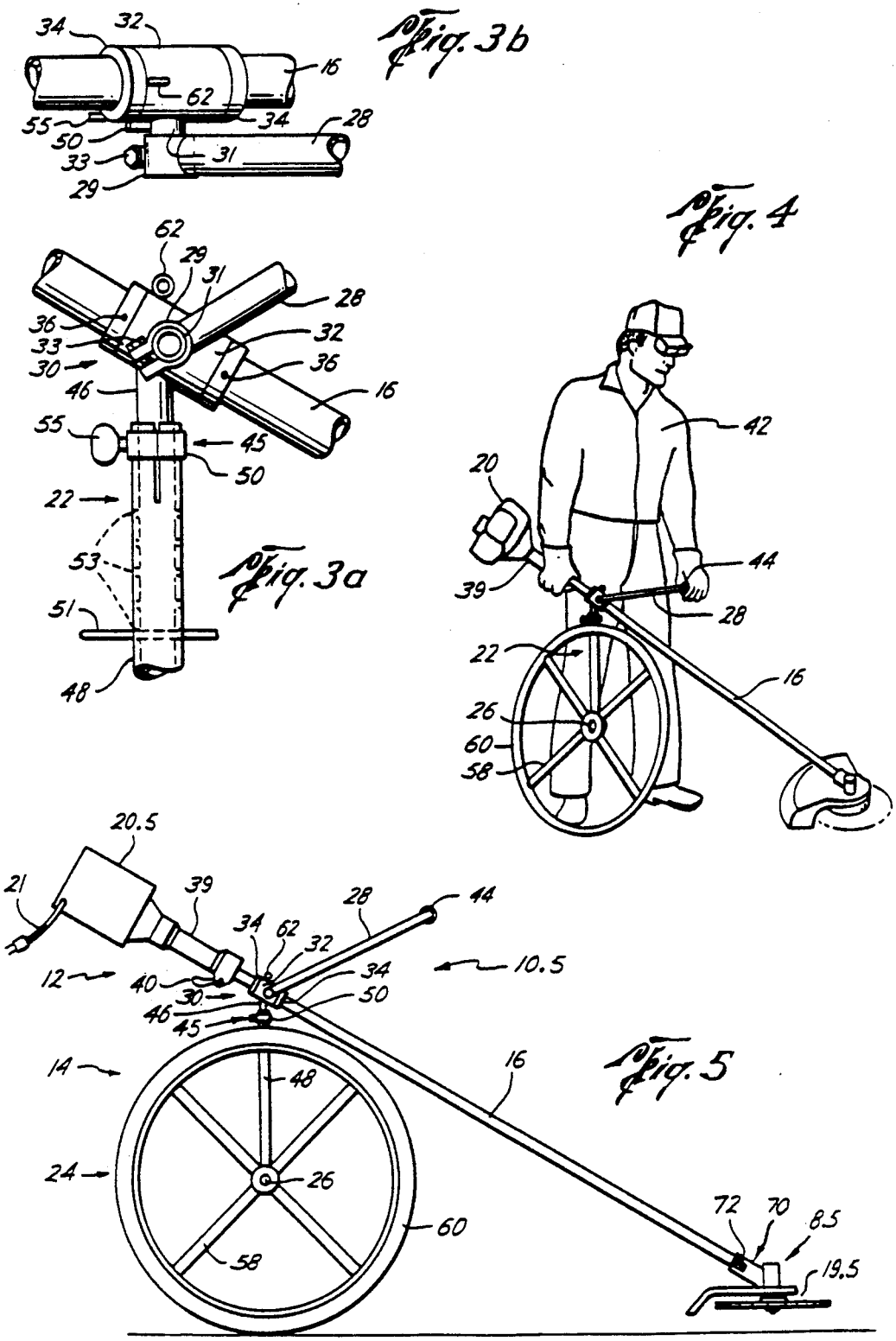

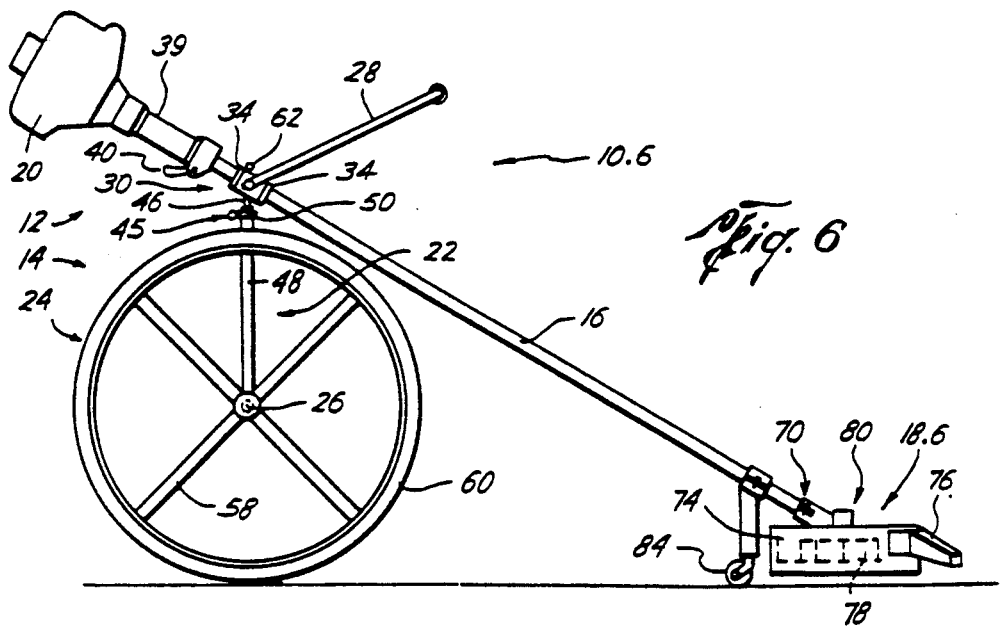
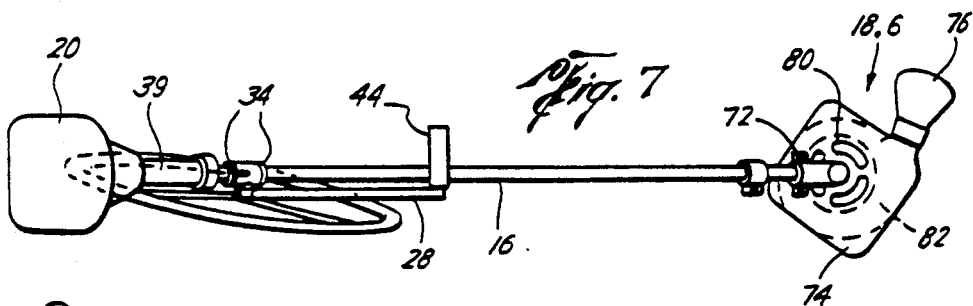
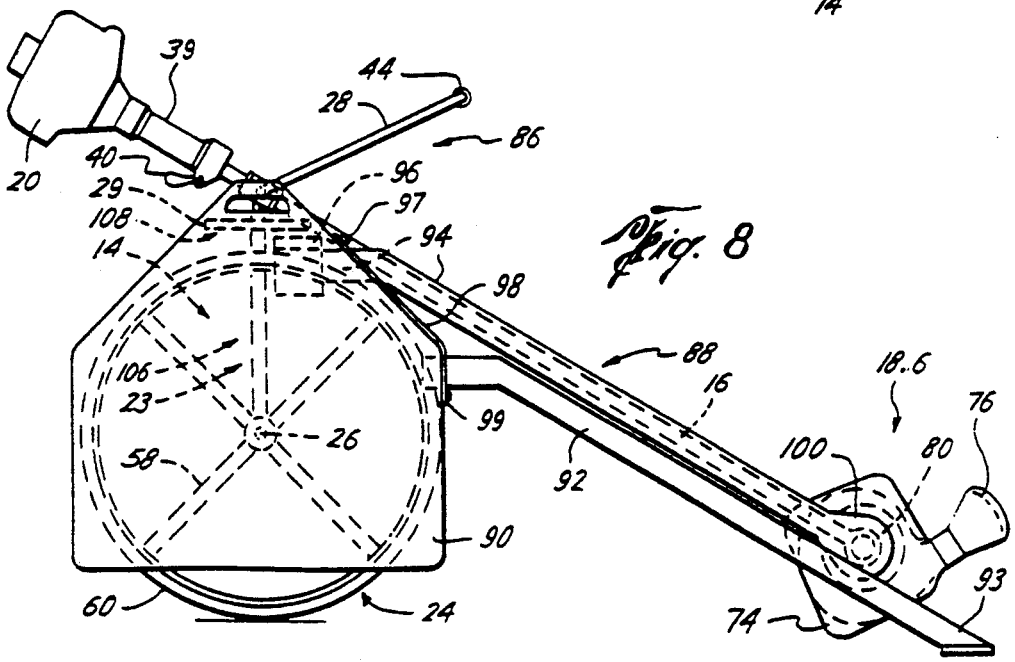

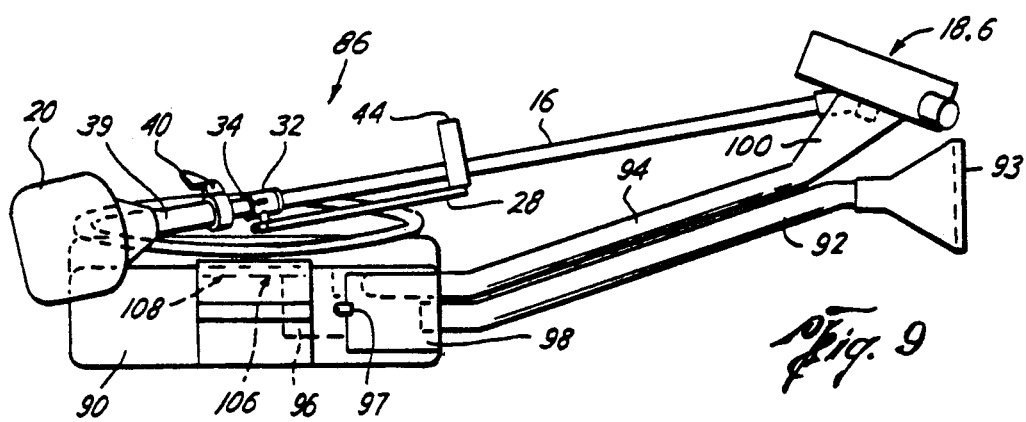
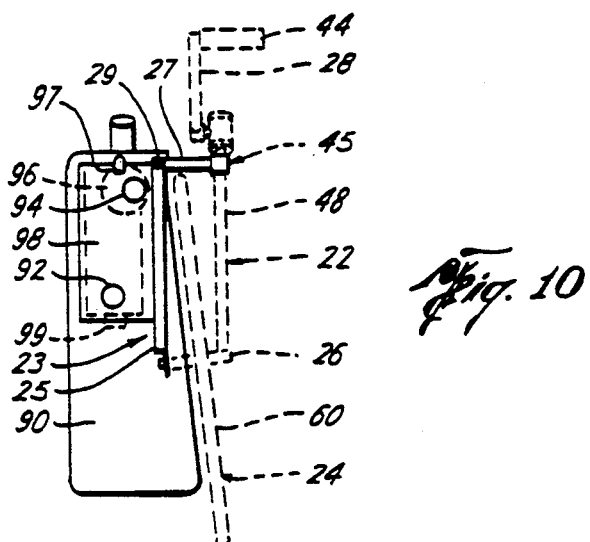
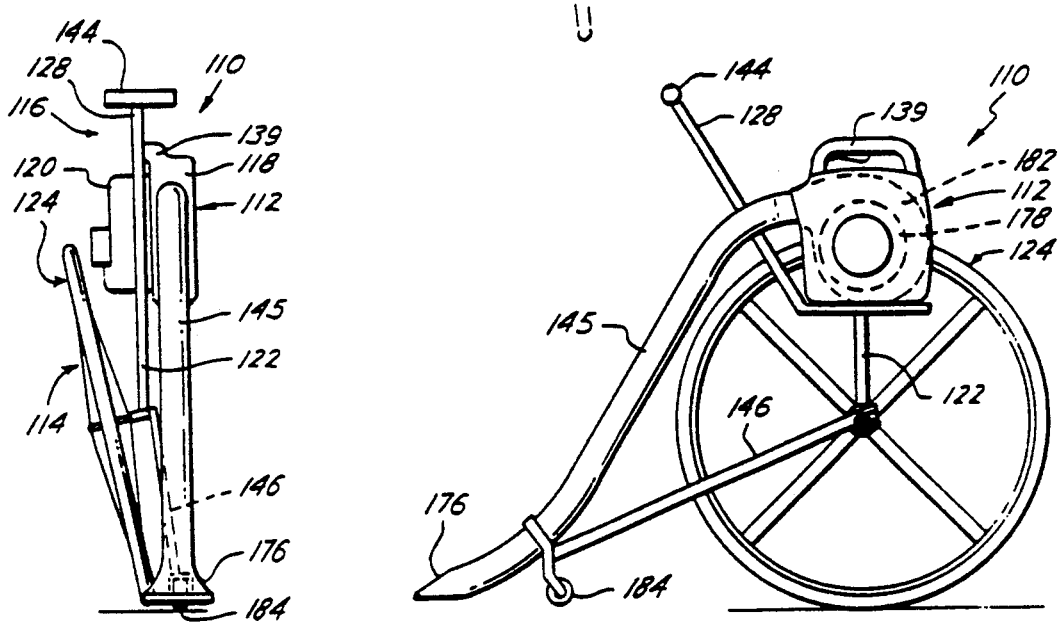

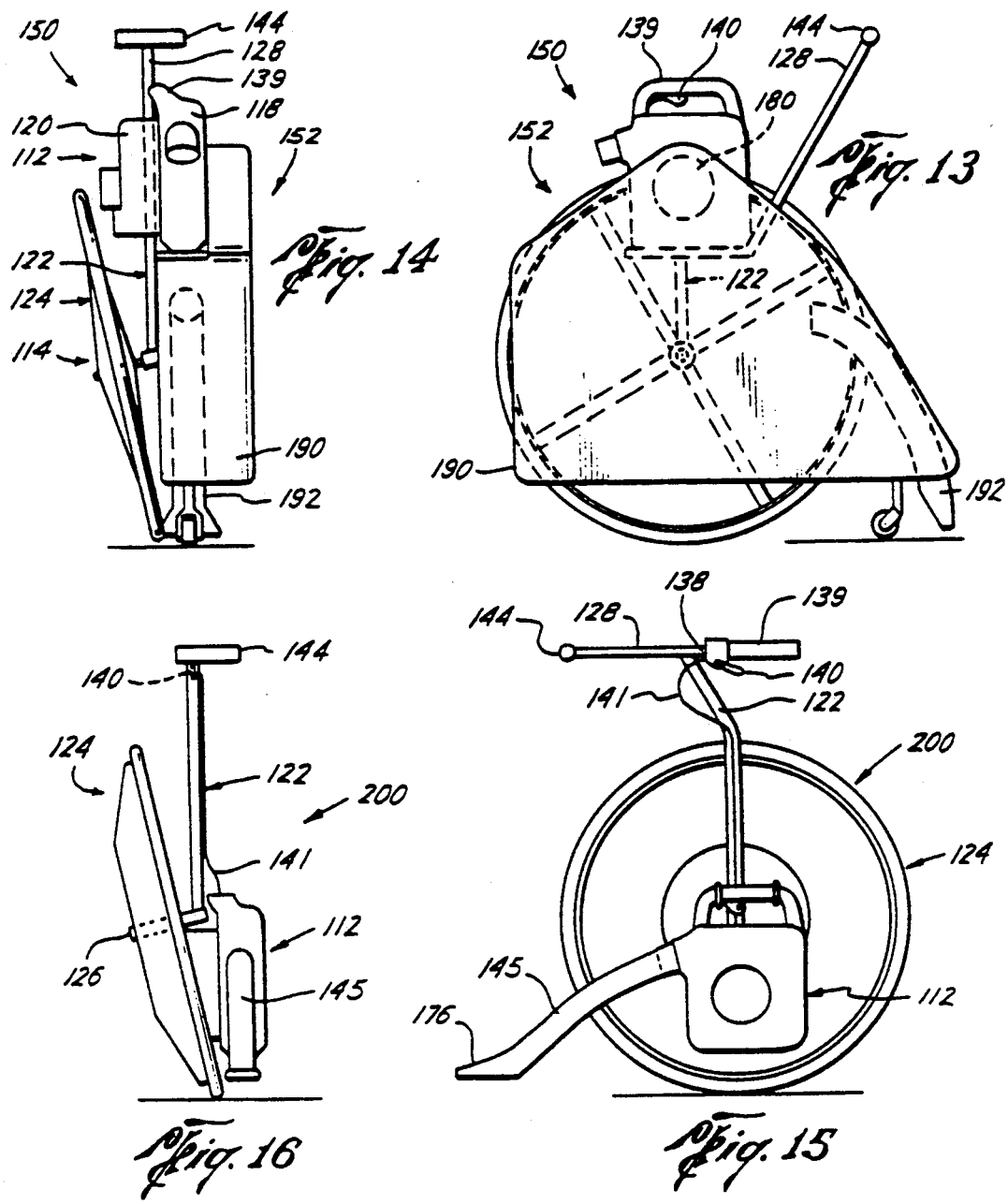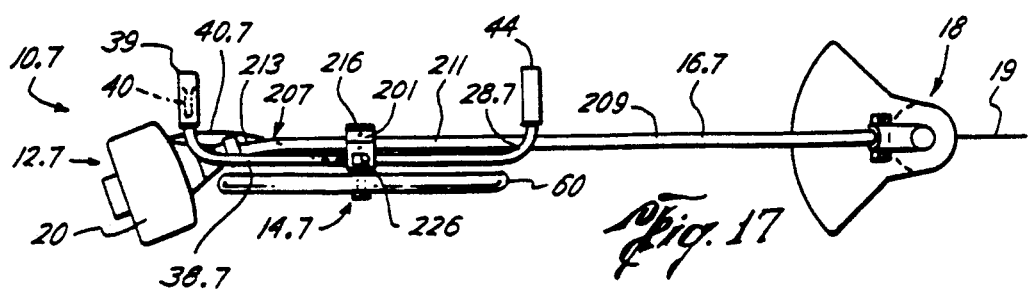

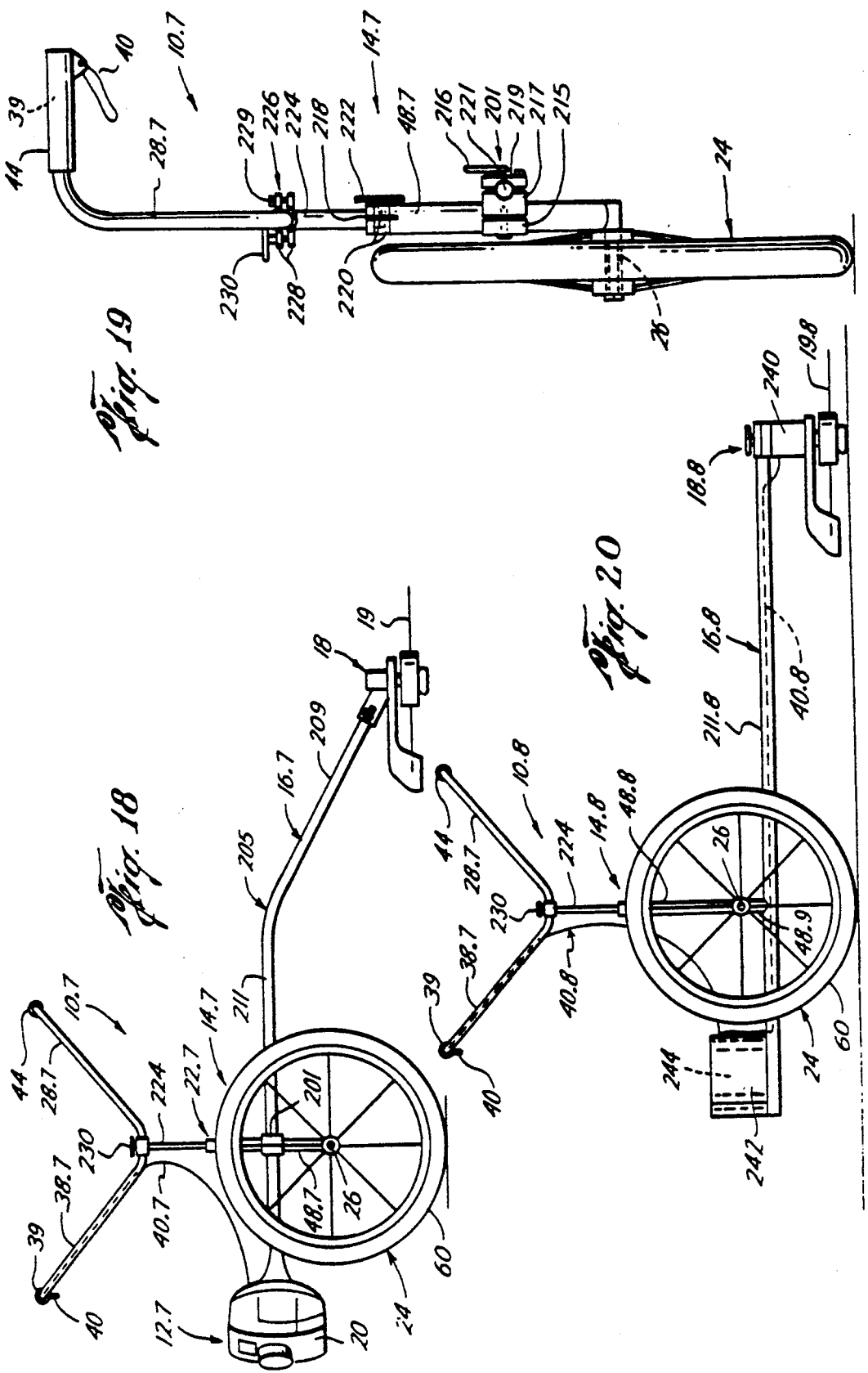

CLEARING APPARATUS AND CARRIAGE FOR CLEARING APPARATUS

BACKGROUND OF INVENTION

This application is a continuation-in-part application of my copending application Ser. No. 850,656 filed Mar. 12, 1992, now abandoned.

This invention relates to a clearing apparatus for use in clearing operations. The invention further relates to a carriage for use in supporting a clearing apparatus.

The clearing apparatus of this invention is, in one aspect, in the form of a trimmer apparatus. The clearing apparatus is, in another aspect, in the form of a blower apparatus. The clearing apparatus is, in another aspect, in the form of a vacuum apparatus. The clearing apparatus may also, in another aspect, be convertible between the various aspects of the invention.

Where the clearing apparatus of this invention is in the form of a trimmer apparatus, it has particular application in the cutting of vegetation in the form of grass, weeds, shrubs and the like. The trimmer apparatus has particular application in regard to a trimmer or cutter of the type which uses a cutting line for cutting or trimming vegetation. The trimmer apparatus can, however, also have application in regard to a trimmer which uses a cutter blade for cutting or trimming vegetation.

Where the clearing apparatus of this invention is in the form of a blower apparatus, or a vacuum apparatus, it may have application in clearing indoors or outdoors areas of dust, debris, leaves, etc.

Applicant is aware of a number of prior patents which disclose various forms of wheeled carriages for supporting trimmers. These patents include U.S. Pat. Nos. 4,845,929—Saki et al.; 3,977,078—Pittenjar; 4,936,886—Quillen; 4,182,100—Litter; 4,891,931—Holland; 4,442,659—Busk; 4,981,012—Claiborne; and 4,829,755—Nance. These patents do, for the most part, present a number of disadvantages.

Some of these disadvantages are that the operator has to support a major portion of the weight of the apparatus; that the apparatus is not supported near its center of gravity; that the apparatus is designed to be operated lawn-mower fashion so that lateral maneuverability of the apparatus is limited; that the operator can not position himself near the center of gravity of the apparatus during use; that the apparatus can not readily traverse obstacles during use; that the apparatus is bulky and difficult to handle, and that the apparatus restricts the reach of the clearing head of the apparatus during use.

It is one of the objects of this invention to provide a trimmer apparatus, and to provide a carriage for supporting a trimmer device, which can reduce or substantially overcome one or more of the disadvantages of the prior patents.

It is a further object of this invention to provide a clearing apparatus which is maneuverable, easy to handle, and can reduce or overcome the disadvantages of the prior art.

In accordance with one aspect of the invention, there is provided a clearing apparatus comprising a clearing device for use in clearing operations, and a carriage for supporting the clearing device during use, the clearing device comprising an elongated support tube, a clearing head mounted at one end of the support tube, and a motor mounted at the other end of the support tube, and the carriage comprising a frame, and a single support wheel rotatably mounted on the frame to support the frame, the frame having a mounting bracket mounting the support tube to the frame and the carriage having a guide handle for use in guiding the apparatus, the support tube being mounted on the frame such that the clearing apparatus will be supported proximate its center of gravity on the support wheel during use.

The support tube will have or will house a drive connection to operatively connect the motor and the clearing head. The drive connection may be a connection of any conventional type, and may comprise or include for example, a drive shaft, a flexible drive shaft, or the like.

In one preferred embodiment of the invention, the guide handle may be arranged for an operator holding the handle to be positioned proximate the center of gravity of the apparatus during use. The apparatus may also be so arranged for an operator to operate the apparatus during use by being positioned or by standing proximate the support wheel. Thus the operator will be positioned substantially in line with part of an axial projection of the support wheel during normal use.

The guide handle may be positioned proximate the center of gravity of the apparatus. Alternatively, the guide handle may be positioned to extend forwardly of the center of gravity of the apparatus, in the direction of the clearing head.

In an embodiment of the invention, the guide handle may form part of the carriage, may be mounted on the mounting bracket, may be mounted on the frame or may be mounted on the support tube of the clearing device.

The clearing apparatus may include a control handle for use in controlling the apparatus. The control handle may preferably be provided on the trailing side of the center of gravity of the apparatus.

In one embodiment of the invention, the control handle may be mounted on the support tube between the motor and the carriage. In an alternative embodiment of the invention, the control handle may be mounted on the trailing side of the motor. The control handle may also be mounted on the motor, on the frame, or on the carriage.

The control handle may preferably include a throttle or control switch for controlling the motor.

In one preferred embodiment of the invention, the guide handle and control handle may be positioned so that when an operator grasps the two handles to operate the apparatus, he or she will be positioned proximate the center of gravity of the apparatus. Thus the operator will preferably be positioned to one side of the support wheel and substantially in line with the axle of the wheel.

The mounting bracket may be of any suitable type. Thus, for example, the mounting bracket may include a mounting sleeve for receiving the support tube. In an alternative example of the invention, the mounting bracket may include a G-clamp or a C-clamp for clamping onto the support tube. In yet a further example of the mounting bracket, it may include a split sleeve or a pair of split rings for engaging with the support tube.

In a preferred embodiment of the invention, the mounting bracket includes a mounting sleeve which has a bushing which allows rotation of the support tube within the sleeve while supporting the support tube on the frame. In this embodiment of the invention, the support tube can be rotated about its elongated axis for varying the tilt of the clearing head to the surface of the ground during use. This allows either side of the clearing head to be raised or lowered.

In the preferred embodiment the bushing comprises a pair of flange bushings which are mounted on the support tube, and which are rotatably positioned within the mounting sleeve. The flange bushings may be removably secured to the support tube by means of set screws or a ring clamp arrangement, or the like.

In a preferred embodiment of the invention, the support tube may be continuously rotatable about its elongated axis so that the tilt of the cutter head may be varied during use and clamped in a desired position. In an alternative embodiment of the invention, the support tube may be rotated about its elongated axis in a limited stepwise movement. Thus, the tilt of the clearing head to the ground can be adjusted stepwise for specific angles to be provided. In a further embodiment, the support tube may be fixed so that it cannot rotate.

In an embodiment of the invention, the clearing apparatus may include a pivot displacement mechanism to permit pivotal displacement of the elongated axis of the support tube relative to the plane of the support wheel. Such pivotal displacement may be a random or continuous displacement where the support tube can be displaced pivotally over a desired range and locked at any point in the range. Alternatively, the pivot displacement may be a stepwise displacement whereby the support tube can be pivotally displaced in a stepwise manner for particular applications. In this embodiment of the invention, the pivot displacement mechanism would include a plurality of locking positions in which the pivotal displacement of the support can be locked. This embodiment of the invention can have particular application where the support tube is displaced and positioned pivotally relatively to the plane of the support wheel when, for example, the clearing head is mounted in a vertically oriented clearing position for particular application such as edging, and also when the clearing head is in the horizontal clearing position, a slight angle of the plane of the wheel to the vertical plane of the support tube allows the operator to move forward while operating the apparatus in a more comfortable position.

In a preferred embodiment of the invention, the support tube is mounted on the carriage so that the elongated axis of the tube extends at an angle of about 5° to 15° and preferably about 10° to the plane of the wheel.

While guiding of the clearing head relatively to the ground is normally relatively easy, the apparatus may, if desired, include a height guide wheel or castor or skid to assist in guiding the height of the clearing head above the ground during use. Such a height guide wheel or castor or skid would tend to be positioned close to the clearing head and may be mounted on the support tube or on the clearing head or could be mounted on the frame for the support wheel so that the rotation of the support tube would not affect the castor or skid.

The apparatus may include a height adjustment mechanism to allow for adjustment of the height of the guide handle to suit the operator. The height adjustment mechanism may also include an adjustment for adjusting the height of the control handle.

The height adjustment mechanism may be provided by the guide handle being provided on a guide handle arm which is pivotally mounted on the frame or on the mounting bracket, or by the mounting bracket being adjustably mounted on the frame. The mounting bracket may be adjustably mounted on the frame by means of a telescopic connection between the mounting bracket and the frame.

In one embodiment of the invention, the guide handle and the control handle may both be substantially in line with the support tube.

In an alternative example of the invention, the guide handle may extend laterally from the vertical plane of the support tube.

In one embodiment of the invention, the position of the guide handle relative to the center of gravity of the apparatus, may be adjustable to suit the requirements of the operator. Any standard adjustment means may be provided for adjusting the position and height of the guide handle.

Where the guide handle extends laterally of the vertical plane of the support tube, the guide handle may extend to one side or to the other for right-handed or left-handed operation. Alternatively, the guide handle may be in the form of a T-shape so that it may be operated in a left-handed mode or a right-handed mode, as desired.

The invention further extends to a clearing apparatus comprising a clearing device for use in clearing operations, and a carriage for supporting the clearing device during use, the clearing device comprising an elongated support tube, a clearing head mounted at one end of the support tube, and a motor mounted at the other end of the support tube, and the carriage comprising a frame, and a single support wheel rotatably mounted on the frame to support the frame, the frame having a mounting bracket mounting the support tube on the frame, the arrangement being such that an operator will be positioned proximate the support wheel axle while operating the apparatus.

The invention further extends to a carriage for supporting a clearing device of the type having a support tube, a clearing head mounted at one end of the support tube for clearing operations, and a motor mounted at the other end of the support tube, the carriage comprising a frame and a single support wheel rotatably mounted on the frame to support the frame, and the frame having a mounting bracket for mounting a support tube of such a clearing device on the frame for the support wheel to support the frame and such a clearing device when mounted thereon, proximate the net center of gravity of the frame and such a mounted clearing device.

The support wheel of the apparatus or carriage of this invention, may be a wheel of any suitable type. If the embodiment has the support wheel in a vertical position directly below the center of gravity of the clearing device, the maximum size of the support wheel will tend to be dictated by the maximum size wheel that will not interfere with the support tube when the support tube is at approximately the correct angle to the ground. Another embodiment has the plane of the support wheel angled from the vertical position to allow more clearance between the axle and the operators leg while maintaining the center of gravity directly above the contact point of the wheel with the ground. In this configuration, the wheel could be larger in diameter. In another embodiment, the support tube may be mounted below the upper-periphery of the wheel so that the mounting height is not affected by the size of the wheel.

The support wheel may be vertical or may be angled from just off of vertical to over 45° and still support the apparatus, but the more the angle, the more side load on the wheel.

In a presently preferred embodiment of one aspect of the invention, the support wheel may be mounted on the frame so that, during use, the wheel will be at an angle of between about 2° and about 10° and preferably about 6° to the vertical while the center of gravity of the apparatus is supported essentially above the contact point of the wheel with the ground.

While the support wheel may be relatively small, the wheel should preferably be as large as possible, since this will give the greatest height to the axle of the wheel and thus improve the ease of handling of the apparatus. The larger the support wheel, the more readily can the apparatus be steered over or past obstacles such as stones, rocks, and bumps, and the more readily can the apparatus be caused to traverse an uneven terrain.

The support wheel may, for example, be in the form of a conventional bicycle wheel. In one preferred embodiment of the invention the bicycle wheel may be a 20, 24, 26 or 27 inch diameter wheel. In a presently preferred embodiment the wheel may be a 700C wheel. For an alternative embodiment the wheel is preferably a 20 inch wheel.

The support wheel may have an inflatable tire. Alternatively, the support wheel may have a solid tire, a foam-filled tire, a semi-pneumatic tire, or the like.

The support wheel may be provided with a large number of bicycle type spokes. Alternatively, it may be provided with a relatively low number of broad support spokes, or even a disc which has the axle mounted at its center, and a tire or the like at its periphery. Also, the axle of the wheel can preferably be off-set to one side to allow more clearance on the other side of the wheel.

In accordance with one preferred embodiment of the invention, the clearing apparatus of this invention is in the form of a trimmer apparatus for use in cutting vegetation in the form of grass, weeds, shrubs and the like.

In accordance with this embodiment of the invention, there is provided a trimmer apparatus comprising a trimmer device for use in trimming vegetation, and a carriage for supporting the trimmer device during use, the trimmer device comprising an elongated support tube, a cutter head mounted at one end of the support tube, a motor mounted at the other end of the support tube, and a drive connection connecting the motor to the cutter head, and the carriage comprising a frame, a single support wheel rotatably mounted on the frame to support the frame, and a guide handle for use in guiding the apparatus, the frame having a mounting bracket for mounting the support tube on the frame such that the trimmer apparatus will be supported proximate its center of gravity on the support wheel during use.

In an alternative preferred embodiment of the invention, the clearing apparatus may be in the form of a blower apparatus for supplying a stream of air to clear areas of leaves, grass cuttings, cuttings, debris, dust and the like.

In accordance with this preferred embodiment of the invention, there is provided a clearing apparatus comprising a blower device for use in blowing debris, and a carriage for supporting the blower device during use, the blower device comprising an elongated support tube, a blower head mounted at one end of the support tube, a motor mounted at the other end of the support tube, and a drive connection connecting the motor to the blower head, and the carriage comprising a frame, a single support wheel rotatably mounted on the frame to support the frame, and a guide handle for use in guiding the apparatus, the frame having a mounting bracket mounting the support tube on the frame such that the clearing apparatus will be supported proximate its center of gravity on the support wheel during use.

In accordance with yet a further preferred embodiment of the invention, the clearing apparatus may be in the form of a vacuum apparatus for use in clearing areas of leaves, cuttings, grass cuttings, debris, dust and the like.

In accordance with this preferred embodiment of the invention, there is provided a clearing apparatus comprising a vacuum device for use in removing debris, and a carriage for supporting the vacuum device during use, the vacuum device comprising an elongated support tube, a vacuum head mounted at one end of the support tube, a motor mounted at the other end of the support tube, and a drive connection connecting the motor to the vacuum head, and the carriage comprising a frame, a single support wheel rotatably mounted on the frame to support the frame, and a guide handle for use in guiding the apparatus, the frame having a mounting bracket mounting the support tube on the frame such that the clearing apparatus will be supported proximate its center of gravity on the support wheel during use.

The clearing head of the clearing device of the clearing apparatus is preferably removably mounted so that the clearing head can be exchanged for clearing heads providing alternative applications in accordance with the invention.

Thus, for example, where the clearing head is in the form of a cutter head, the cutter head may be removed and replaced with a blower head for blowing, or a suction head for vacuum operations. Alternatively, the blower head may be adjustable by adding suction tubes to the blower head to convert the blower head to a vacuum apparatus.

The invention therefore further extends to a cutting head, to a blower head, to a suction head, and to a modified blower head for vacuuming, for mounting on the end of the support tube.

The invention further extends to a vacuum kit comprising a vacuum container and vacuum tubing for connection to the blower head air inlet for application to the apparatus to provide a vacuum apparatus.

In accordance with yet a further aspect of the invention, there is provided a blower apparatus comprising a blower device for use in clearing operations, and a carriage for supporting the blower device during use, the blower device having a body portion comprising a motor and a blower head, and having a blower tube extending from the blower head, and the carriage comprising a frame, a single support wheel rotatably mounted on the frame to support the frame, and a guide handle for use in guiding the apparatus, and the blower device being mounted on the frame such that the blower apparatus will be supported proximate its center of gravity on the support wheel during use.

In accordance with yet a further aspect of the invention, there is provided a vacuum apparatus comprising a vacuum device for use in clearing operations, and a carriage for supporting the vacuum device during use, the vacuum device having a body portion comprising a motor and a vacuum/blower head, and having a debris collection box and filter/screen attached to the vacuum/blower head, and having a vacuum tube extending from the collection box, and the carriage comprising a frame, a support wheel rotatably mounted on the frame to support the frame, and a guide handle for use in guiding the apparatus, and the vacuum device being mounted on the frame such that the vacuum apparatus will be supported proximate its center of gravity on the support wheel during use.

The invention further extends to a clearing device comprising a motor, an elongated support tube, and a blower head mounted at the end of the support tube to be driven by the motor through a drive shaft extending along the support tube. The blower head may be removable for the replacement by a cutter head or the like.

The invention further extends to a clearing apparatus comprising a clearing device for use in clearing operations, and a carriage to which the clearing device is mounted for the carriage to support the clearing device during use. The handle is preferably positioned so that an operator grasping the handle for guiding the apparatus during use, will be positioned on one side of and substantially in line with the axial projection of the support wheel, or substantially in line with the axle of the support wheel during normal use.

The power unit may be a power unit of any suitable type. Thus, for example, the power unit may be a motor, a gas powered motor, an electric motor, a battery, or the like.

The invention further extends to a clearing apparatus comprising a clearing device for use in clearing operations and a carriage to support the clearing device during use.

The guide handle may be mounted on a guide handle arm and the control handle may be mounted on a control handle arm, with the guide handle and control handle arms being pivotally mounted on the frame substantially at the center of gravity of the clearing apparatus.

The invention further extends to a carriage for supporting a clearing device of the type having an elongated support member, a clearing head mounted at one end of the elongated support member, a power unit mounted at the other end of the elongated support member, and a power connection connecting the power unit to the clearing head.

BRIEF DESCRIPTION OF THE DRAWINGS

Preferred embodiments of the invention are now described by way of example with reference to the drawings.

FIG. 3a shows a detailed view of a portion of the trimmer apparatus of FIGS. 1 and 2a.

FIG. 3b shows a plan view of the portion of the apparatus shown in FIG. 3a.

FIG. 4 shows a sketch of a person operating the trimmer apparatus of FIGS. 1-3.

FIG. 5 shows a side elevation of an alternative embodiment of the trimmer apparatus of FIG. 1, wherein the motor of the trimmer apparatus is in the form of an electric motor, and the cutter head is in the form of a cutter blade instead of a line cutter.

FIG. 6 shows a side elevation of another preferred embodiment of a clearing apparatus in accordance with this invention, in the form of a blower apparatus.

FIG. 7 shows a plan view of the blower apparatus of FIG. 6, except that in FIG. 7 the blower nozzle is directed sidewardly rather than forwardly as shown in FIG. 6.

FIG. 8 shows a side elevation of FIG. 6 wherein the blower apparatus of FIG. 6 has been converted into a vacuum apparatus.

FIG. 9 shows a plan view of the vacuum apparatus of FIG. 8.

FIG. 10 shows a front view of the vacuum apparatus of FIGS. 8 and 9 but with the motor support tube and vacuum head omitted for clarity. This view shows how the vacuum container connects to the support frame.

FIG. 11 shows a side elevation of an alternative embodiment of a blower apparatus in accordance with this invention.

FIG. 12 shows a front view of the apparatus of FIG. 11.

FIG. 13 shows a side elevation of the alternative embodiment of a blower apparatus in FIG. 12, converted into a vacuum apparatus.

FIG. 14 shows a rear view of the apparatus of FIG. 13.

FIG. 15 shows a side elevation of an alternative embodiment of a blower apparatus in accordance with this invention.

FIG. 16 shows a front elevation of the apparatus of FIG. 15.

FIG. 17 shows a plan view of yet a further alternative preferred embodiment of a clearing apparatus in accordance with this invention in the form of a trimmer apparatus.

FIG. 18 shows a side elevation of the apparatus of FIG. 17.

FIG. 19 shows, to an enlarged scale, a detailed front view of a portion of the trimmer apparatus of FIGS. 17 and 18, with the trimmer device omitted for the sake of clarity.

FIG. 20 shows a side elevation of yet a further alternative embodiment of a clearing apparatus in accordance with this invention, in the form of a battery-powered trimmer apparatus.

With reference to FIGS. 1 to 4 of the drawings, reference numeral 10 refers to one preferred embodiment of a clearing apparatus in the form of a trimmer apparatus in accordance with this invention. The trimmer apparatus 10 comprises a trimmer device 12 for use in trimming vegetation such as grass, weeds, shrubs, etc., and a carriage 14 for supporting the trimmer 12 during use.

Figure 1:
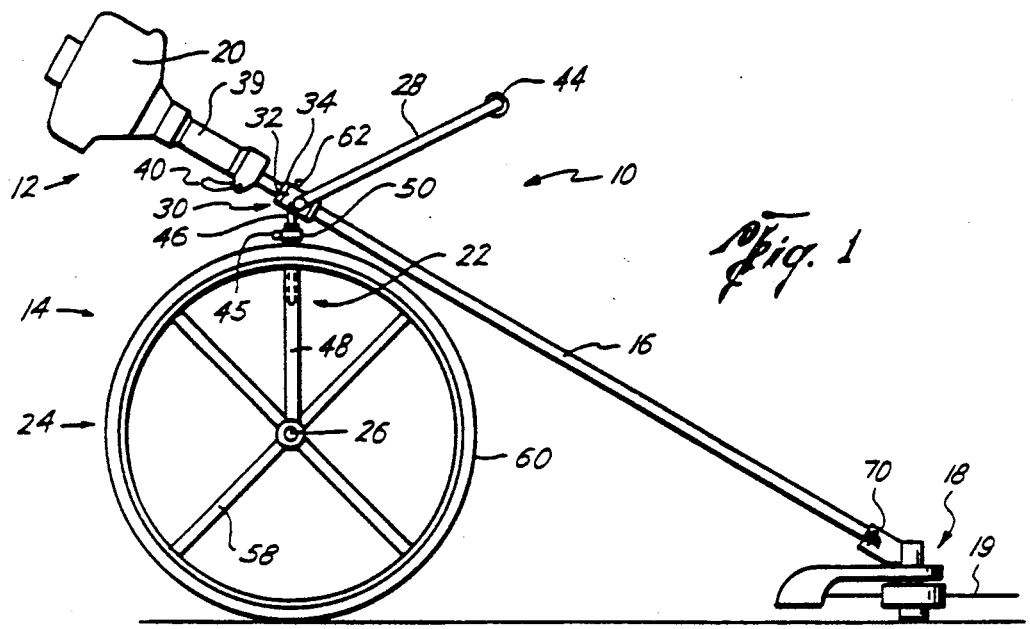
FIG. 1 shows a side elevation of one preferred embodiment of a clearing apparatus in accordance with this invention, in the form of a trimmer apparatus.

The trimmer device 12 is a trimmer of any suitable conventional type, and which comprises an elongated support tube 16, a cutter head 18 mounted at one end of the support tube 16, and a motor 20 mounted at the other end of the support tube 16.

The trimmer device 12 illustrated in FIGS. 1 to 4 of the drawings is a trimmer device of the type made by Echo wherein the cutter head 18 has cutter means which is of the line-type or string type, wherein the motor 20 is a gasoline powered motor, and wherein a drive shaft extends along the bore of the support tube 16 between the motor 20 and the cutter head 18.

While the drive shaft of the Echo trimmer device is a rigid drive shaft which is housed within a linear support tube 16, a flexible drive shaft may also be used if desired. Where a flexible drive shaft is used, the support tube 16 need not be linear, but may be curved or may have curved portions along its length, as desired.

While the trimmer device 12 is of the type made by Echo, it will be appreciated that the trimmer apparatus of this invention can have application in regard to trimmers made by other manufacturers merely by adapting the mounting bracket so that the required trimmer device 12 can be mounted on carriage 14. Depending upon the size of the trimmer device, the carriage 14 may also require a change in shape or configuration so that the trimmer device can be mounted on the carriage in accordance with the objectives of this invention.

While the trimmer device 12 may be various models of trimmer devices as made Echo and by other manufacturers, the presently preferred trimmer devices for use in this invention are the Echo trimmer devices which are supplied under the following model designations: model designation SRM-1501, and model designation SRM 3000.

The carriage 14 comprises a frame 22 and a single support wheel 24 rotatably mounted on the frame 22 to support the frame 22. The support wheel 24 is rotatably mounted on the frame 22 about the axle 26 of the support wheel 24.

The frame 22 has a mounting bracket 30 which removably mounts the support tube 16 on the frame 22 such that the trimmer apparatus 10 will be supported substantially at its center of gravity on the support wheel 24 during use. The mounting bracket 30 has a guide handle 44 for use in guiding the apparatus 10 during use. The guide handle 44 is supported on a guide handle arm 28.

The mounting bracket 30 comprises a mounting sleeve 32 having a bushing in the form of a pair of flange bushings 34 rotatably mounted within the mounting sleeve 32.

The flange bushings 34 are sized to be rotatably received within the mounting sleeve 32 so that the support tube 16 may be rotatably displaced about its elongated axis within the mounting sleeve 32 via the bushings 34.

The flange bushings 34 are preferably removable so that, for different trimmer devices 12, different bushings can be provided to snugly accommodate the diameters of the support tube 16 of the different types of trimmer devices 12 to be used with the carriage 14.

The support tube 16 may be positively located within the mounting bracket 30 at an appropriate position along its length, by providing set screws 36 in the flanges of the flange bushings 34 which lock the bushings 34 to the support tube 16. The bushings could instead have split flanges which could be clamped onto the support tube 16 instead of the set screws 36, if desired.

For mounting the trimmer device 12 on the carriage 14, the motor 20 may be disconnected from the support tube 16, the support tube 16 may then be guided through the bushings 34 and the mounting sleeve 32 and locked in position with the set screws in the flanges of the bushings 34. The motor 20 may then be remounted on the support tube 16.

Alternatively, if desired, for mounting the trimmer device 12 on the carriage 14, the cutter head may be disconnected from the support tube 16, the support tube 16 may then be guided through the bushings 34 and the mounting sleeve 32 and locked in position on the support tube 16. The cutter head 18 may then be remounted on the support tube 16.

In the Echo trimmer device, the drive shaft located within the support tube 16 has external splines on both ends. Complementary internal splines connect the motor 20 and the cutter head 18 to these external splines. Thus the support tube can be inserted, into the mounting bracket 30 from either end, as desired.

In the Echo trimmer devices, the cutter head 18 has a first bevel gear which is driven by the drive shaft, and has a second bevel gear which cooperates with the first bevel gear, and has the cutter connected thereto. The cooperating bevel gears thus ensure that the rotating drive shaft drives the cutter.

It will appreciated, however, that any other conventional form of connection may be provided between the drive shaft and the cutter head. In the same way, any other form of conventional driving mechanism may be provided for the drive shaft to drive the cutter whether the cutter is in the form of a line cutter, a blade, or the like.

The apparatus 10 further includes a control handle 39 for use in controlling the trimmer device 12.

In the one preferred embodiment illustrated in FIGS. 1 to 4 of the drawings, the control handle 39 is mounted on the support tube 16 between the motor 20 and the mounting bracket 30. In this preferred embodiment of the invention, where the trimmer 12 is a trimmer of the type made by Echo, the control handle 39 is of the standard type which is mounted on the support tube 16 of the Echo trimmer.

The control handle 39 includes a throttle 40 for controlling the motor 20.

The trimmer device 12 is mounted on the carriage 14 by means of the mounting bracket 30 so that the net center of gravity of the trimmer device 12 and the carriage 14, is substantially above the contact point of the support wheel 24 and the ground. Thus, the trimmer apparatus 10 is supported substantially at its center of gravity on the single support wheel 24.

The guide handle arm 28 extends upwardly and forwardly from the center of gravity to a comfortable height and position for an operator 42 to hold the guide handle 44 of the guide handle arm 28. The operator 42 is shown in FIG. 4 of the drawings handling the trimmer apparatus 10 during use. The control handle 39 is positioned on the support tube 16 so that it is at a convenient position along the support tube 16 and at a convenient height to be handled by the operator 42.

In the preferred embodiment, the guide handle 44 of the guide handle arm 28 and the control handle 39 are arranged so that when they are gripped by an operator 42 in his two hands, the operator 42 will be standing substantially at or proximate the center of gravity of the trimmer apparatus 10. In other words, the operator will be standing substantially in line with the axle 26 of the support wheel 24 as shown in FIG. 4.

In use, therefore, the operator 42 will be facing in a generally forward direction towards the cutter head 18. Thus, the position of the support tube 16, motor 20, and cutter head 18 will be substantially better in relation to the operator 42, than it is when the trimmer device 12 is used manually or with a harness supporting the trimmer device 12 on the shoulders of the operator.

The frame 22 includes a height adjustment mechanism 45 for use in adjusting the height of mounting bracket 30. This is shown in particular in FIG. 3a. While the height adjustment mechanism 45 may be a mechanism of any conventional type, it is conveniently, as illustrated in FIG. 3a, a telescopic mechanism in which a vertical tubular portion 46 of the mounting bracket 30 is slidably positioned within a vertical tubular portion 48 of the frame 22, and a locking sleeve 50 is provided to lock the tubular portion 46 relatively to the tubular portion 48 of the frame 22. The adjustment mechanism 45 also includes a height adjustment pin 51 which extends through the frame 22 through any of the height adjustment holes 53. The pin 51 thus controls the extent to which the tubular portion 46 extends telescopically into the tubular portion 48.

By means of the height adjustment mechanism 45, the height of the guide handle 44 and the control handle 39 can be adjusted to facilitate ease and convenience of handling by an operator 42.

The adjustment mechanism 45 also allows pivotal displacement of the mounting bracket 30 relative to the plane of the support wheel 24. The pivotal displacement of the mounting bracket 30 to the plane of the wheel can be locked in any position with the locking sleeve 50. To aid in quickly finding the desired pivotal displacement for a particular operation, the lower end of the vertical tubular portion 46 of the mounting bracket 30 is notched to engage the height adjustment pin 51 and act as a detent before clamping the locking sleeve 50. The locking sleeve 50 can also have a can lock or quick clamp instead of the bolt 55 shown in FIG. 3a to make the adjustment quicker.

As can be seen particularly in FIGS. 3a and 3b of the drawings, the pivotal displacement connection 45 allows the elongated axis of the support tube 16 to be displaced pivotally relatively to the plane of the support wheel 24 between a standard position where the elongated axis of the support tube 16 is at a slight angle of approximately 10° to the plane of the support wheel 24, to a pivotally displaced position of approximately 35° to the plane of the support wheel 24.

While the pivotal displacement connection allows the apparatus 10 to be used where the support tube 16 is at any desired angle to the plane of the wheel 24, the normal position, where operation is most comfortable in this embodiment, is where the tube 16 has been pivotally displaced to extend at an angle of about 10° to the plane of the wheel 24.

A laterally displaced position of about 35° is, for example, appropriate for use of the trimmer device 12 in an edging position where the cutter means 19 of the cutter head 18 is mounted for cutting in a vertical plane. In this position, the angle between the support tube 16 and the plane of the support wheel 24 is such that the support wheel 24 can be displaced in a direction parallel to the vertical plane of the cutter head 18 in its edging orientation.

The frame 22 may be formed out of any rigid lightweight material such as steel or aluminum as a synthetic plastic material.

In a presently preferred embodiment of the invention, the frame 22 is formed out of aluminum or thin wall steel tubing of round section.

The support wheel 24 is, in this presently preferred embodiment of the invention, in the form of a standard 700C bicycle wheel having conventional bicycle wheel spokes, or having a fewer number of larger spokes 58. The axle 26 has its hub off-set to one side of the wheel 24 (as shown particularly in FIG. 2b) to allow more clearance during use from the operator's leg. The support wheel 24 further has a conventional inflatable tire 60.

Figure 2A:
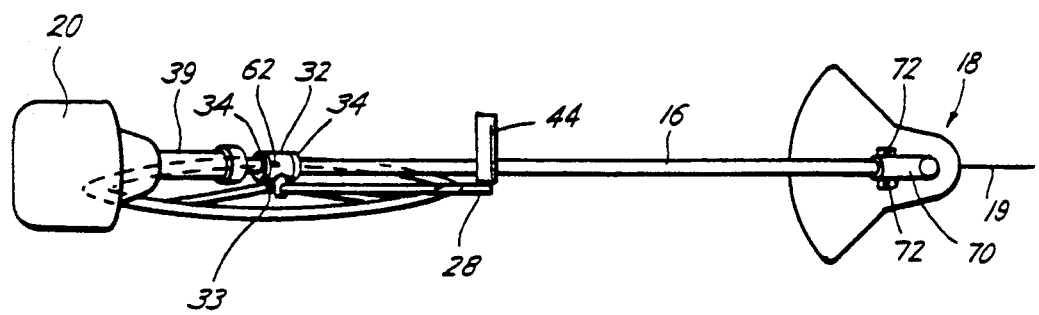
FIG. 2a shows a plan view of the apparatus of FIG. 1.
Figure 2B:
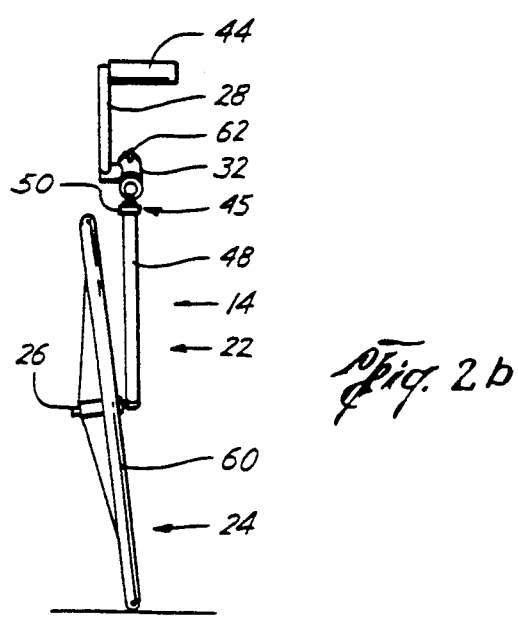
FIG. 2b shows a front view of the apparatus of FIG. 1 with the trimmer device omitted for clarity.

The axle 26 also extends at an angle of about 96° to the frame 22 so that, during use, the plane of the support wheel 24 will be at an angle of about 6° to the vertical as shown particularly in FIG. 2b. Thus the apparatus 10 is supported by the wheel 24 during use with the center of gravity of the apparatus 10 directly above the contact point of the wheel 24 with the ground.

Because the trimmer 12 is fairly lightweight compared to the weight normally to be supported by a conventional bicycle wheel, the tire 60 may instead be filled with a foam synthetic plastic material, and the conventional spokes may be replaced with broad spokes 58 of a synthetic plastic material or with a complete disk of a synthetic plastic material or of a metal alloy.

The preferred embodiment of the apparatus 10, as illustrated in the drawings, can provide a number of advantages.

By using a single support wheel 24 of the bicycle wheel type, which is relatively large, the apparatus 10 can easily traverse obstacles such as rocks, stones and bumps which are encountered during use of the apparatus 10.

Because the apparatus 10 pivots about a single contact point of the support wheel 24 on the ground, the cutter head 18 can readily be displaced from side to side during use for the cutter head 18 to have its maximum effect without the operator 42 having to take unnecessary steps. The reach of the cutter head 18 is therefore enhanced over that provided by other prior devices.

In addition, since the support tube 16 can rotate about its elongated axis within the bushings 34 of the mounting bracket 30, the operator can readily lean the apparatus 10 towards and away from him or herself, while maintaining the parallel relationship of the plane of the cutter 19 with the ground. By so doing the operator can readily enhance the extent of lateral travel of the cutter head 18 during use.

Because the trimmer device 12 and carriage 14 are supported substantially at their center of gravity on the support wheel 24, the apparatus 10 is very easy to control and does not require the operator 42 to carry any significant portion of the weight of the apparatus 10 during use.

During use, therefore, the operator 42 can easily steer the apparatus past or over obstacles. Further, by using the guide handle 44 and the control handle 39, and because the operator 42 is standing substantially in line with the axle 26, he or she can readily lift the apparatus 10 over obstacles or the like. This is facilitated by the fact that both hands of the operator are substantially in line with the center of gravity of the device during use.

The preferred embodiment has the further advantage that the carriage 14 is of simple and inexpensive construction, and can be light enough where it can be readily handled, not only for using the apparatus 10, but also for lifting the apparatus 10 when the apparatus is to be transported or stored.

The preferred embodiment of the apparatus 10 can provide the further advantage that because the apparatus is supported on a single support wheel 24, there is little resistance to the lateral displacement of the cutter head 18 during use, even when obstacles are in the path of the support wheel 24. In addition, when the apparatus 10 is used on a slope, whether it be a steep slope or a gradual slope, the single wheel allows the apparatus to be maintained in a substantially vertical plane while such a slope is being traversed, while allowing the cutter head to be rotated to match the plane of the slope.

Because the operator stands virtually at the center of gravity of the apparatus 10 during use, the apparatus allows virtually the same degree of lateral and forward movement as would be provided by a hand held trimmer.

The embodiment illustrated in FIGS. 1 to 4 of the drawings can provide the further advantage that not only can the apparatus 10 be used by a right- or left-handed operator, but the operator can switch sides as desired, to reduce fatigue. For left-handed operators the support wheel 24 can be moved to the other side of the support tube 16 simply by loosening the clamp 50 and rotating the vertical tube 48 to a position where to support wheel 24 is on the other side of the support tube 16.

The apparatus 10 as illustrated in FIGS. 1 to 4 of the drawings can provide the further advantage that the trimmer device 12 can readily be removed from the carriage 14 either to use the trimmer device 12 as a hand-held trimmer or for storage purposes. In the same way, the carriage 14 can be used with a variety of models and makes of trimmers merely by adapting the flange bushings 34 of the mounting sleeve 32, or by adapting the mounting bracket 30 itself.

The carriage 14 is therefore a versatile apparatus in itself which can readily be adapted for use with a variety of different models and makes of standard trimmers, particularly those of the line cutter type. The carriage 14 is also versatile since, as discussed below, it can also be used to support blower devices and vacuum devices of various types.

The apparatus 10 provides the further advantage that it puts no relative displacement in the vertical plane of the support tube 16 relatively to the carriage 14. Thus, all vertical movement of the cutter head 18 relatively to the ground during use can be provided by pivotal displacement of the frame 22 and thus the support tube 16, about the axle 26 of the support wheel 24.

As further shown, particularly in FIGS. 1 and 3 of the drawings, the trimmer 12 is shown having an attachment device 62 on the mounting sleeve 32 for use in attaching the trimmer device 12 to a standard shoulder harness when dismounted from the carriage 14, and when used in conventional hand-held fashion.

The mounting sleeve 32 forms part of the mounting bracket 30. In the preferred embodiment as illustrated in FIGS. 1–4 of the drawings, the mounting bracket 30 is itself removably mounted on the remainder of the frame 22.

By releasing the locking sleeve 50 the mounting bracket 30 can be disengaged from the frame 22 to thereby dismount the trimmer device 12 with the mounting bracket 30 and the guide handle 28, from the remainder of the carriage 14. In this way, the attachment device 62 can be engaged with a harness to allow the device to be used in a hand-held operation, and it can readily be remounted onto the carriage 14 when desired.

The guide handle arm 28 is mounted on the mounting bracket 30 via a split sleeve 29 which is pivotally mounted on a mounting tube 31 extending from the mounting sleeve 32. A locating screw 33 cooperates with the split sleeve 29 to clamp the split-sleeve 29 onto the mounting tube 31. This provides an additional adjustment mechanism for adjusting the height of the guide handle 44.

With reference to FIG. 5 of the drawings, reference numeral 10.5 refers generally to an alternative embodiment of the trimmer apparatus 10 as illustrated in FIGS. 1–4 of the drawings.

The trimmer apparatus 10.5, as illustrated in FIG. 5, corresponds in all respects with the trimmer apparatus 10 except that in place of the gasoline powered motor 20, the trimmer apparatus 10.5 is powered by means of an electric motor 20.5 having a cord 21 extending therefrom.

Furthermore, the trimmer apparatus 10.5 of FIG. 5 differs from the trimmer apparatus 10 of FIGS. 1–4, in that instead of cutter head 18 having cutter means 19 in the form of a line cutter, the cutter head 18.5 has cutter means 19.5 in the form of a blade mounted thereon.

The cutter means 19.5 in the form of a blade is more effective than a line cutter for cutting shrubs and thicker stalks, branches, and the like.

In the trimmer apparatus 10.5 of FIG. 5, those parts of the trimmer apparatus having corresponding parts to those of the trimmer apparatus 10 of FIGS. 1–4 are indicated by corresponding reference numerals.

As can be seen in FIGS. 1–5 of the drawings, the cutter heads 18 and 18.5 are removably mounted on the ends of the elongated support tubes 16. They are shown mounted in position by means of split clamps 70 having tightening screws 72.

By loosening the tightening screws 72, the split clamps 70 release from the elongated tubes 16, and the cutter heads 18 and 18.5 can be removed from the support tubes 16.

This allows the trimmer apparatus 10 and 10.5 to be converted to a blower apparatus or a vacuum apparatus, if desired. This also readily allows the cutter head 18 to be replaced by a cutter head 18.5 when required, or the blade 19.5 can be put directly on the cutter head 18 in place of the line trimmer.

With reference to FIGS. 6 and 7 of the drawings, reference numeral 10.6 refers generally to a clearing apparatus which is in the form of a blower apparatus.

The blower apparatus 10.6 of FIGS. 6 and 7 corresponds in all respects to the trimmer apparatus 10 or 10.5 of FIGS. 1–5, except that the cutter heads 18 or 18.5, as the case may be, have been replaced by a blower head 18.6.

The blower head has a split clamp 70 which mounts the blower head 18.6 onto the elongated tube 16.

Since the blower apparatus 10.6 corresponds in all respects, except for the blower head 18.6, with the trimmer apparatus 10 of FIGS. 1–4, corresponding parts of the blower apparatus 10.6 to those of the trimmer apparatus 10, are indicated by corresponding reference numerals.

The blower head 18.6 may be of any conventional type or construction. The blower head 18.6 has a housing 74 upon which the split clamp 70 is mounted.

The housing 74 has a blower nozzle 76 removably mounted thereon. The blower nozzle 76 may, if desired, be an integral part of the housing 74.

The housing 74 has an impeller 78 rotatably mounted therein. The impeller 78 has a bevel gear which cooperates with the first bevel gear provided on the drive shaft within the tube 16, so that the impeller 78 can be rotatably driven during use. As with the trimmer device 12, a flexible drive shaft may also be used if desired.

The housing 74 has an air intake zone 80 through which air can be drawn into the central axis zone of the impeller 78.

As can be seen in particularly in FIG. 7 of the drawings, housing 74 defines a spiral cavity along the periphery of the impeller 78 expanding gradually towards the blower nozzle 76. The spiral cavity is generally identified by reference numeral 82.

The blower head 18.6 is further shown with a castor wheel 84 mounted on the elongated support tube 16. It may, however, be mounted on the blower head 18.6 if desired. The castor wheel 84 supports the blower head 18.6 on the ground so that an operator need not be concerned with maintaining the blower head 18.6 at an appropriate height. A skid could be used instead of a castor.

While a castor such as the castor 84 may be used with the cutter head 18 or 18.5, this would generally not be the case. Where the cutter head 18 or 18.5 is used for cutting or trimming vegetation and the like, the terrain is generally fairly rough and there is no need for the height of the cutter head 18 or 18.5 to be controlled or maintained at a certain position above the ground. This is, however, a useful feature for a blower head such as the blower head 18.6.

The angle of the air flow from the nozzle 76 can be raised or lowered by rotating the support tube 16 within the bushings 34 of the mounting bracket 30. The angle changes because the nozzle 76 is directed forward when the operator is in a comfortable position. This forms an angle of approximately 10 degrees between the vertical plane of the support tube 16 and the air flow from the nozzle 76. As the support tube 16 is rotated, the vertical plane of the support tube does not change, but the direction of the air flow does change.

In FIG. 6 of the drawings the nozzle 76 is directed generally in the forward direction with the air intake zone 80 directed upwardly.

In FIG. 7 of the drawings a more preferred arrangement is shown where the blower head 18.6 is mounted so that the nozzle 76 is directed sidewardly. This sideward direction facilitates ease of use since the blowing effect can be provided on debris and the like by sweeping the head 18.6 in successive transverse arcs.

The blower housing 74 can be mounted to direct the air flow to any desired angle.

The blower apparatus 10.6 is again supported substantially at its center of gravity on the support wheel 24 so that the blower apparatus 10.6 provides the ease of handling, maneuverability and lateral reach as described with reference to the trimmer apparatus 10.

The blower apparatus 10.6 may also, as illustrated in FIG. 5, be provided with an electric motor instead of a gasoline powered motor, if desired.

It will be appreciated that the blower head 18.6 may be permanently attached to the support tube 16 where the clearing apparatus 10.6 is designed and intended to be used as a blower apparatus only and there is no requirement for the apparatus to be convertible to a trimmer apparatus 10 or to any other form of apparatus.

With reference to FIGS. 8 to 10 of the drawings, reference numeral 86 refers generally to a vacuum apparatus which has been formed by converting the blower apparatus 10.6 of FIGS. 6 and 7, into the vacuum apparatus 86.

The vacuum apparatus 86 corresponds in all respects with the blower apparatus 10.6 of FIGS. 6 and 7, except that the vacuum apparatus 86 has a vacuum kit 88 mounted thereon. The vacuum kit 88 comprises a vacuum container 90 mounted on the carriage 14, a suction tube 92 leading to the vacuum container 90, a flow tube 94 leading from the vacuum container 90, and a filter 96 removably mounted on the flow tube 94 in the vacuum container 90.

The vacuum container 90 has a lid 98 which is removable to permit access to the filter 96 and to allow the contents of the vacuum container 90 to be emptied.

The flow tube 94 has a connecting flange 100 connecting the flow tube 94 to the air intake zone 80 of the housing 74 of the blower head 18.6 as illustrated in FIGS. 6 and 7.

In the vacuum apparatus 86, the support tube 16 has been rotated through approximately 90° so that the nozzle 76 is directed upwardly for discharging air upwardly. The suction tube 92 has a vacuum nozzle 93 at its leading end. During use air flows into the vacuum nozzle 93, through the suction tube 92, along the flow tube 94 (after having passed through the container 90), into the air intake zone 80 and then out of the nozzle 76. The vacuum apparatus 86 can be used as a blower simply by rotating the support tube 16 to a position where the vacuum nozzle 93 is directed upwardly and the blower nozzle 76 is at the proper position for blowing debris.

The housing 74 is made of any suitable material, such as, for example, synthetic plastic or fiber glass or light weight metal alloy materials, and the blower nozzle and discharge nozzle have tapered shanks so that they can be fitted into position by means of a friction fit on the outlet of the housing 74 and can readily be removed when required.

The container adapter 23 has a vertical section 25 which is clamped to the opposite side of the axle 26 from the frame 22 and has a horizontal section 27 which attaches to the vertical tube 48 of the frame 22. The vertical section 25 and horizontal section 27 are shown in FIG. 10. The container adapter 23 also has a horizontal section 29 which supports the vacuum container 90 during use. The horizontal section 29 is shown in FIG. 8.

The vacuum container 90 has mounting grooves 106 and 108 for receiving the container adapter 23 of the carriage 14 as illustrated in FIGS. 8 and 9, when the vacuum kit 86 is fitted to the carriage 14 to convert the blower apparatus 10.6 of FIGS. 6 and 7 into a vacuum apparatus.

The vacuum container 90 can readily be emptied, when desired, by removing the lid 98 with the flexible tubes 92 and 94 attached, and lifting the vacuum container 90 off of the container adapter 23 and dumping the debris out of the hole which the lid 98 covered. The lid 98 can be held in position with any suitable closure mechanism such as the rotating latch 97 as shown in FIG. 9 and the off-set tab 99 as shown in FIG. 10.

As described in the prior figures, the vacuum apparatus 86 is supported substantially about its center of mass on the support wheel 24. Thus, the vacuum apparatus can provide the many advantages already discussed in connection with the trimmer apparatus 10. It can provide the further advantage that the vacuum apparatus 86 can readily be converted to a blower apparatus 10.6 or to a trimmer apparatus 10 or 10.5, when desired.

With reference to FIGS. 11 and 12 of the drawings, reference numeral 110 refers generally to an alternative embodiment of a blower apparatus in accordance with this invention.

The blower apparatus 110 comprises a blower device 112 for use in clearing operations, and a carriage 114 for supporting the blower device 112 during use. The blower device 112 has a body portion 116 comprising a motor 118 and a blower head 120.

The blower head 120 includes an impeller 178 and a spiral shaped discharge chamber 182 to discharge air from the blower head 120.

The blower head 120 has a blower tube 145 extending therefrom.

The carriage 114 comprises a frame 122 and a single support wheel 124 rotatably mounted on the frame 122 to support the frame. The frame 122 has a guide handle 144 for use in guiding the apparatus 110.

The blower device 112 is mounted on the frame 122 such that the blower apparatus 110 will be supported proximate its center of gravity on the support wheel 124 during use. Because of the shape and positioning of the body portion 116, the wheel 124 will be inclined to the ground during use so that the contact point of the wheel 124 with the ground is substantially at the center of gravity of the apparatus 110 during use. This is shown in FIG. 12. This arrangement will not affect the maneuverability or convenience of use of the device, and it can therefore provide many of the advantages as already discussed.

The apparatus 110 further has a brace 146 extending between the frame 122 and the blower tube 145 to further support the blower tube 145. The brace 146 has a castor 184 mounted thereon for keeping the nozzle 176 of the blower tube 145 at a desired height during use. The castor 184 could be replaced with a skid if desired.

With reference to FIGS. 13 and 14 of the drawings, reference numeral 150 refers generally to a vacuum apparatus in accordance with this invention.

The vacuum apparatus 150 has been formed by removing the blower tube 145 and brace 146 from the blower apparatus 110. The guide handle 144 is moved to the other side of the blower device 112. A vacuum container 190 is attached to the frame 122. The vacuum container 190 has an opening which coincides with the air intake 180 of the blower device 112. The vacuum apparatus 150 is operated from the opposite side and the operator faces the opposite direction than he would operate the blower apparatus 110.

With reference to FIGS. 15 and 16 of the drawings, reference numeral 200 refers generally to an alternative embodiment of a blower apparatus in accordance with this invention.

The blower apparatus 200 corresponds generally with the blower apparatus 110 of FIGS. 11 and 12, and corresponding parts are indicated with corresponding reference numerals.

In the blower apparatus 200 the blower device 112 is mounted on the frame 122 so that it is supported substantially below the axle 126 of the wheel 124.

The wheel 124 has its axle 126 off-set as shown particularly in FIG. 16 so that a portion of the blower device 112 is accommodated within the wheel 124. The off-set effect of the axle 126 could alternatively, or additionally, be provided by a dished configuration of the wheel 124. Thus, with the wheel inclined for use as shown in FIG. 16, the blower apparatus 200 is supported with its center of gravity substantially above the contact area of the wheel 124 with the ground.

The blower apparatus 200 has the frame 122 extending upwardly from the axle 126, has a control handle 139 mounted on a control handle arm 138 for controlling the blower device 112, and has a guide handle arm 128 with a guide handle 144, extending from the frame 122. A throttle 140 is provided on the control handle 139 and is connected to the blower 112 by means of a cable or cord 141.

The blower apparatus 200 can provide the advantage that the low center of gravity improves the stability of the apparatus and can facilitate the use of the apparatus.

With reference to FIGS. 17 to 19 of the drawings, reference numeral 10.7 refers generally to a further alternative preferred embodiment of the trimmer apparatus 10 of FIGS. 1 to 4.

The trimmer apparatus 10.7 corresponds in general with the trimmer apparatus 10 and those parts of the trimmer apparatus 10.7 which correspond with parts of the trimmer apparatus 10, are indicated by corresponding reference numerals.

The trimmer apparatus 10.7 comprises a trimmer device 12.7 and a carriage 14.7 for supporting the trimmer device 12.7 during use.

The presently preferred trimmer device 12.7 for the apparatus 10.7 is the Echo trimmer device SRM 2501 with its support tube 16.7 bent at two bend locations 205 and 207, and having a flexible drive shaft within the support tube 16.7 operatively connecting the cutter head 18 with the motor 20.

The bend location 205 is on the leading side of the carriage 14.7, whereas the bend location 207 is on the trailing side of the carriage 14.7.

The support tube 16.7 is bent about the bend location 205 so that the leading part 209 of the support tube 16.7 between the bend location 205 and the cutter head 18, is at an angle of about 30° to the intermediate part 211 of the support tube 16.7 This angle of 30° allows the cutter device 19 to be substantially parallel to the intermediate part 211 (as seen in FIG. 18). Thus, by rotating the intermediate part 211 through 90°, the cutter device 19 will be positioned in a vertical plane for edging operations.

The trailing part 213 of the support tube 16.7 on the trailing side of the bend location 207 is at an angle of about 20° to the intermediate part 211. The trailing part 213 is angled so that the motor 20 is less likely to interfere with the legs of an operator of the apparatus 10.7 during use. This also places the motor 20 more in-line with the plane of the support wheel 24.

The carriage 14.7 comprises a frame 22.7 and a single support wheel 24 rotatably mounted on the frame 22.7 about the axle 26.

The wheel 24 is, in this embodiment, preferably a 20 inch diameter wheel having spokes and having a semi-pneumatic type tire 60.

The frame 22.7 comprises a tubular frame portion 48.7 which is mounted on the axle 26 and is arranged to extend substantially vertically upwardly from the axle 26 during use.

The tubular frame portion 48.7 has a mounting bracket 201 mounted thereon. The mounting bracket may be fixed to the tubular frame portion 48.7 or may be displaceable along the tubular frame portion 48.7. The mounting bracket 201 may comprise two first cooperating parts 215 & 217 which are screwed or bolted together and which define a bore receiving the tubular frame portion 48.7. By bolting the parts 215 & 217 together, the bracket 201 can be bolted onto the tubular frame portion 48.7.

The mounting bracket further comprises two second cooperating parts 217 & 219 which together define a bore 221 for receiving the support tube 16.7.

The second cooperating parts 217 & 219 are shown in FIG. 17 to 19 where they are clamped together by means of a T-handle screw or a quick release cam type clamp 216, to thereby clamp the support tube 16.7 in position in the mounting bracket 201 and thus on the frame 22.7. By releasing the T-handle screw or the quick release cam clamp the support tube 16.7 can be rotated about its own axis, or can be disengaged from the frame 22.7. The trimmer device 12.7 has been omitted from FIG. 19 for the sake of clarity.

The mounting bracket 201 is preferably mounted about 4 inches above the axle 26 to give sufficient vertical maneuverability for the cutter head 18 during use. This distance may, of course, vary with the type of trimmer device 12.7, the size of the wheel 24, the size of the motor 20, and the preference of the operator. The distance may, for example, be from zero to 6, 8 or 10 inches, if desired, with the objective being to mount the trimmer device so that its center of gravity is at the axle of the wheel or close to it. In an alternative arrangement, the mounting bracket may be provided below the axis of the wheel to further lower the center of mass of the apparatus, consistent with sufficient clearance for the motor 20 so that the cutter head 18 can be raised as required for usual operation.

The tubular frame portion 48.7 is split on its upper end portion by means of a slit 218. Two bosses 220 are mounted on the tubular frame portion 48.7 on opposed sides of the slit 218. The bosses 220 are connected together by means of a T-handle screw 222 as shown in FIG. 19.

The frame 14.7 further includes a handle support tube 224 which is telescopically received within the tubular frame portion 48.7 to allow for adjustment of the height of the guide handle 44 and control handle 39.

The vertical adjustment of the handle support tube 224 is effected by means of the T-handle screw 222 and the telescopic displacement of the tube 224 within the tubular frame portion 48.7.

The handle support tube 224 has a split locking sleeve 226 mounted thereon. The split locking sleeve 226 comprises two bosses 228 which are connected together at one end by a back-up screw 229, and at the other end by a T-handle screw 230.

The split locking sleeve 226 clamps the guide handle arm 28.7 and control handle arm 38.7 to the handle support tube 224. The T-head screw 230 can be released to allow the arms 28.7 and 38.7 to be pivotally displaced relatively to the handle support tube 224. In addition, by pivotally displacing the handle support tube 224 relatively to the tubular frame portion 48.7 through the T-handle screw 222, the arms 28.7 and 38.7 can be displaced laterally relatively to the plane of the wheel 24.

The guide handle 44 and control handle 39 can thus be adjusted in height and in their lateral relationship to the plane of the wheel 24 as may be desired by an operator, or for storage purposes.

The control handle 39 has a throttle 40 mounted thereon. The throttle 40 is connected to the motor 20 by means of a throttle connect cord 40.7.

The embodiment of the invention illustrated in FIG. 17–19 of the drawings, provides much the same advantages of the prior embodiments of the trimmer apparatus of this invention as already discussed. Amongst these advantages are the fact that the trimmer apparatus 10.7 is again supported on the axle of the wheel 24 substantially about the center of the gravity of the apparatus. Thus, during use, an operator of the apparatus can easily handle and steer the apparatus without having to support any significant portion of the weight of the apparatus.

The guide handle 44 of the guide handle arm 28.7 is provided on the leading side of the center of gravity of the apparatus 10.7. It is thus between the axle 26 and the cutter head 18. The control handle 39 of the control handle arm 38.7 is provided on the trailing side of the center of gravity of the apparatus 10.7.

This arrangement of the guide handle 44 and control handle 39, ensures that an operator operating the trimmer apparatus 10.7 will be positioned substantially in line with an axial projection of the wheel 24, or with at least part of an axial projection of the wheel 24 during normal operation. Indeed, with the handles arranged as illustrated in FIGS. 17 to 19, the operator will be standing substantially in line with the center of gravity of the trimmer apparatus 10.7 during use, and substantially in line with the axle 26 during use.

With this arrangement, the operator can lean on the handles 44 and 39 so that part of his weight is supported by the trimmer apparatus 10.7 during use thereby making it less tiring to use the apparatus 10.7.

Furthermore, because the operator stands substantially in line with the center of gravity of the apparatus during use, he can readily and easily control the movement of the apparatus not only while he is moving the apparatus 10.7 in its forward direction, but while he is swinging the cutter head 18 laterally to perform trimming operations, and even while moving the apparatus 10.7 in its trailing direction. This arrangement also makes it very easy for the operator to control the height of the cutter head 18.

In the same way, when the support tube 16.7 has been rotated through 90° so that the cutter device 19 of the cutter head 18 is operating in a vertical or substantially vertical plane for edging purposes, the operator can control the operation of the apparatus in a very easy manner. In this arrangement the plane of the cutter device will be substantially parallel to the plane of the wheel, thereby allowing easy operation of the apparatus during edging.

This arrangement of the apparatus also allows the operator to have the same freedom of movement of the cutter head 18 for trimming operations, as an operator would have who was holding the trimmer device in his hands and operating it manually without the benefit of the carriage 14.7 to carry the weight of the trimmer device.

Because the handles 39 and 44 can be displaced laterally relatively to the plane of the wheel 24, an operator can adjust the handles to suit the particular preferences of the operator. The most comfortable position would tend to be the position where the handle arms 28.7 & 38.7 extend parallel to the plane of the wheel 24 as shown in FIGS. 17 to 19, or where the handle arms extend at an acute angle of less than about 60°, and preferably less than about 30° to the plane of the wheel 24.

Because the handles 44 and 39 are mounted on the handle support tube 224, the height of the handles can be adjusted over a wide range to accommodate operator of different heights and different preferences for handle height. A change in the handle height does not change the angle of the cutter head to the ground as it does with a hand held trimmer device.

The trimmer apparatus 10.7 has a center of mass in the vertical direction, which is very much closer to the axle 26 than the trimmer apparatus 10. The fact that center of mass of the trimmer apparatus 10.7 has been lowered relatively to the axle 26, as compared with the apparatus 10, can provide a number of advantages.

Thus, for example, when stopping or starting the trimmer apparatus 10.7, or when the wheel 24 encounters an obstacle, the inertia of the mass of the trimmer apparatus 10.7 will tend to have a much reduced tendency to rotate the mass about the axle 26 than in the case of the trimmer apparatus 10. This makes it easier, therefore, to guide the cutter head 18 of the trimmer apparatus 10.7 so that it remains at a substantially constant height above the ground of the operation.

The trimmer apparatus 10.7 can provide the further advantage that when the trimmer apparatus 10.7 is tilted about the axle 26 to raise or lower the cutter head 18 relatively to the ground, such movement does not change the balance of the apparatus to the same extent as in the case of the trimmer apparatus 10. In addition, when the trimmer apparatus 10.7 is leaned in the lateral direction, that is in a direction perpendicular to the plane of the support wheel, the off-balance weight to be supported by the operator will tend to be substantially less than in the case of the trimmer apparatus 10.

Even when the guide handle arm 28.7 and control handle arm 38.7 extend at a distinct angle to the plane of the wheel, the operator will still be positioned on one side of the support wheel 24 and substantially in line with the center of gravity of the apparatus. This facilitates handling of the apparatus and further, of course, allows the operator to lift the entire trimmer apparatus 10.7 by the handles 44 and 39 without it affecting the balance of the apparatus.

By angling the trailing part 213 of the support tube 16.7 in the manner as illustrated in FIGS. 17 and 18, the motor 20 is moved laterally away from the operator, thereby allowing more leg room for the operator. This also allows the wheel to be displaced further away from the operator to allow more foot room, while still keeping the center of mass approximately over the contact point of the wheel with the ground. This again facilitates ease of handling of the trimmer apparatus 10.7.

For storing the trimmer apparatus 10.7, the guide handle arm 28.7 and control handle arm 38.7 can be pivotally displaced in the split locking sleeve 226 downwardly into close proximity with the wheel 24. The trimmer apparatus 10.7 can then be placed on its side resting on the handles 44 and 39 with the motor 20 supported off the ground in an easily accessible position.

By having the motor 20 supported well below the handles 39 and 44, the starting cord of the motor 20 can easily be pulled by an operator holding the handle 39. The operator can thus start the motor 20 while holding the trimmer apparatus 10.7 in its operative position.

By extending the tubular frame portion 48.7 to below the axle 26, and by correspondingly changing the length of the leading part 209 relatively to the length of the 211 of the support tube 16.7, the trimmer device could even be supported below the axle 26 of the wheel 24 if desired.

With the arrangement of the apparatus in accordance with this invention, where the operator is positioned substantially in line with the lateral projection of the single wheel which supports the apparatus, the operator has full lateral movement of the clearing head or cutter head in the case of a trimmer apparatus. The operator can move the cutter head from one side of his body to the other side in one continuous motion. This allows the operator to cut a swath of grass or weeds up to a width of approximately twice the distance from the operator to the cutter head while standing in the same spot. While using the apparatus of this invention, the operator has free movement of the apparatus without having to support any significant portion of the weight of the apparatus. Further, the operator can control the height of the clearing head during use by simply controlling the difference in the height of the control and guide handle. At the same time, since the guide and control handles are positioned on opposed sides of the center of gravity of the apparatus, and since the operator is positioned substantially at the center of gravity of the apparatus, the operator can, during use, readily lift the apparatus by means of the handles to traverse obstacles, steps, rocks and the like.

The positioning of an operator relatively to the apparatus of this invention can provide the further significant advantage that the operator can turn the apparatus through 360° in either direction by remaining substantially in the same place. This can be a substantial advantage in handling the apparatus of this invention.

With reference to FIG. 20 of the drawings, reference 10.8 refers to a further alternative embodiment of an apparatus in accordance with this invention. The apparatus 10.8 is in the form of a trimmer apparatus and corresponds substantially with the configuration of the trimmer apparatus 10.7 of FIGS. 17 and 18.

The trimmer apparatus 10.8 of FIG. 20 differs from the trimmer apparatus 10.7 in that the apparatus 10.8 is adapted to be powered by means of a battery and an electric motor.

The apparatus 10.8 has those parts which correspond with the parts of the apparatus 10.7 as illustrated in FIGS. 17-19, indicated by corresponding reference numerals.

In the apparatus 10.8, the cutter head 18.8 has an electric motor 240 mounted thereon for driving the cutter device 19.8.

The apparatus 10.8 further has a battery housing 242 on the trailing side of the support tube 16.8. The battery housing 242 is shown having a battery 244 located therein.

A control cable 40.8 extends from the battery 244 to the throttle 40 or switch on the grip 39 to the electric motor 240 to control the operation of the electric motor.

The battery housing 242 may be pivotally suspended on the trailing end of the support tube 16.8 so that the battery 244 will tend to remain in a vertical orientation during use. With this arrangement, even when the support tube 16.8 is displaced through 90° to use the cutter device 19.8 in its edging orientation, the battery 244 will tend to remain in a vertical orientation.

In an alternative embodiment of the invention, the leading end of the support tube 16.8, having the electric motor 240 and the cutter head 18.8 mounted thereon, may be pivotally adjustable about the axis of the support tube 16.8. In this embodiment the intermediate section 211.8 of the support tube 16.8 may be fixed to the mounting bracket 201, and to form an edging operation, the electric motor and cutter head 18.8 can be pivotally displaced through 90°. In this embodiment the intermediate portion 211.8 of the support tube 16.8 may be welded or otherwise integrally attached to the frame portion 48.7.

The battery 244 may of course be a rechargeable battery. It may also, of course, be a battery of the type which does not need to be maintained in any particular orientation, such as the Gel/Cell (trademark) battery.

The battery may also, if desired, be arranged in a wrap configuration to extend around the wheel and thus provide for a more balanced weight distribution, if desired.

Since the entire apparatus 10.8 is supported substantially about its center of gravity on the wheel 24, both the electric motor 240 and the battery 244 can be of the heavy-duty type thereby permitting effective and heavy-duty operation of the apparatus 10.8. This same concept can, of course, be applied in the vacuum and blower operations of the apparatus of this invention.

In FIG. 20, the support tube 16.8 is a straight tube, and is mounted on the frame 14.8 by being mounted onto an extension portion 48.9 which extends from the frame portion 48.7. The extension portion 48.9 extends from the frame portion 48.7 past and below the axle 26.

In this embodiment the center of mass of the apparatus 10.8 is very low and can provide a number of advantages in handling the apparatus. This arrangement can also be applied to the other embodiments of the invention, including the vacuum and blower embodiments, provided sufficient clearance is maintained between the power unit or motor and the ground for the height variations which may be required for the clearing head.

I claim:

1. A clearing apparatus comprising a clearing device for use in clearing operations, and a carriage to which the clearing device is mounted for the carriage to support the clearing device during use;

the clearing device comprising an elongated support member, a clearing head mounted at a leading end of the support member, a power unit mounted at a trailing end of the support member, and a drive connection connecting the power unit to the clearing head;

and the carriage comprising a frame, a single support wheel rotatably mounted on the frame to support the frame during use, and a handle for use in guiding the apparatus;

the clearing device being mounted to the carriage such that the clearing apparatus will be supported proximate its center of gravity on the support wheel during use;

and the handle being positioned for an operator grasping the handle for guiding the apparatus during use, to be positioned to one side of the support wheel and substantially in line with part of an axial projection of the support wheel during normal use.

2. A clearing apparatus according to claim 1, in which the handle is positioned for an operator grasping the handle for guiding the apparatus during use, to be positioned on one side of and substantially in line with the axial projection of the support wheel during normal use.

3. A clearing apparatus according to claim 2, in which the handle is positioned for an operator grasping the handle for guiding the apparatus during use, to be positioned substantially in line with the axle of the support wheel during use.

4. A clearing apparatus according to claim 1, in which the handle comprises a guide handle and a control handle.

5. A clearing apparatus according to claim 4, in which the guide handle is positioned proximate the center of gravity of the apparatus.

6. A clearing apparatus according to claim 4, in which the guide handle is positioned on the leading side of the center of gravity of the apparatus, between the center of gravity of the apparatus and the clearing head.

7. A clearing apparatus according to claim 4, in which the control handle is mounted on the clearing device.

8. A clearing apparatus according to claim 4, in which the control handle is mounted on the carriage.

9. A clearing apparatus according to claim 6, in which the control handle is positioned proximate the center of gravity of the apparatus.

10. A clearing apparatus according to claim 4, in which the guide handle is positioned on the leading side of the center of gravity of the apparatus, and the control handle is positioned on the trailing side of the center of gravity of the apparatus.

11. A clearing apparatus according to claim 10, in which the guide handle and control handle are positioned so that an operator grasping the handles for operating the apparatus will be positioned substantially proximate the center of gravity of the apparatus during normal use.

12. A clearing apparatus according to claim 4, in which the guide handle is adjustably supported on the carriage for adjusting the height of the guide handle.

13. A clearing apparatus according to claim 4, in which the guide handle is adjustably supported on the carriage for adjusting the position of the guide handle laterally relatively to the plane of the support wheel.

14. A clearing apparatus according to claim 4, in which the control handle is adjustably supported on the carriage for adjusting the height of the control handle.

15. A clearing apparatus according to claim 4, in which the control handle is adjustably supported on the carriage for adjusting the position of the control handle laterally relatively to the plane of the support wheel.

16. A clearing apparatus according to claim 1, in which the clearing device is mounted on the carriage by means of a mounting bracket which is mounted on the frame, and which mounts the elongated support member to the frame.

17. A clearing apparatus according to claim 16, in which the mounting bracket mounts the elongated support member pivotally to the frame, for the elongated support member to be pivotally displaceable about its elongated axis for varying the inclination of the clearing head to the plane of the support wheel.

18. A clearing apparatus according to claim 16, including a lateral displacement mechanism to permit lateral displacement of the elongated support member relatively to the plane of the support wheel.

19. A clearing apparatus according to claim 1, which includes a height guide wheel to assist in guiding the height of the clearing head above the ground during use.

20. A clearing apparatus according to claim 1, in which the power unit comprises a motor for driving the clearing head.

21. A clearing apparatus according to claim 20, in which the motor is a gas powered motor.

22. A clearing apparatus according to claim 20, in which the drive connection comprises a drive shaft operatively connecting the clearing head to the motor.

23. A clearing apparatus according to claim 22, in which the drive shaft is a flexible drive shaft.

24. A clearing apparatus according to claim 1, in which the elongated support member comprises an elongated support tube having the drive connection positioned within the tube.

25. A clearing apparatus according to claim 1, which is in the form of a trimmer apparatus, with the clearing device being in the form of a trimmer device for trimming vegetation, and with the clearing head being in the form of a cutter head.

26. A clearing apparatus according to claim 25, in which the cutter head is a cutter of the line-type using a flexible line for cutting.

27. A clearing apparatus according to claim 1, which is in the form of a blower apparatus, with the clearing device being in the form of a blower device, and with the clearing head being in the form of a blower head.

28. A clearing apparatus according to claim 1, which is in the form of a vacuum apparatus, with the clearing device being in the form of a vacuum device, and with the clearing head being in the form of a vacuum head.

29. A clearing apparatus according to claim 28, including a vacuum container which is supported on the carriage, a suction tube leading to the vacuum container, and a flow tube connecting the vacuum container to the vacuum head.

30. A clearing apparatus according to claim 29, in which the vacuum head, vacuum container, suction tube and flow tube are removably supported on the apparatus.

31. A vacuum kit for use with a clearing apparatus as claimed in claim 25, the vacuum kit comprising a vacuum head to be mounted on the leading end of the elongated support member in place of the cutter head of the trimmer device, a vacuum container to be mounted on the carriage of such an apparatus, a suction tube to lead to the vacuum container, and a flow tube to connect the vacuum container to the vacuum head.

32. A clearing apparatus according to claim 1, in which the power unit comprises a battery positioned in a housing, in which the clearing head includes a motor for driving the clearing head, and in which the power connector comprises a power cord to lead electric power from the battery to the motor.

33. A clearing apparatus comprising a clearing device for use in clearing operations and a carriage to support the clearing device during use;
   the clearing device comprising an elongated support tube, a clearing head mounted at a leading end of the support tube, a motor mounted at a trailing end of the support tube, and a drive shaft connecting the motor to the clearing head;
   the carriage comprising a frame, a single support wheel rotatably mounted on the frame to support the frame during use;
   the clearing device being mounted to the carriage such that the clearing apparatus will be supported proximate its center of gravity on the support wheel during use;
   and the clearing apparatus further comprising a guide handle and a control handle to be grasped by the operator for operating the apparatus during use, the guide handle being positioned on a leading side and the control handle being positioned on a trailing side of the center of gravity of the clearing apparatus.

34. A clearing apparatus according to claim 33, in which the guide handle is mounted on a guide handle arm and the control handle is mounted on a control handle arm, with the guide handle and control handle arms being pivotally mounted on the frame substantially at the center of gravity of the clearing apparatus.

35. A clearing apparatus according to claim 33, in which the guide handle and control handle are positioned so that an operator grasping these handles to operate the apparatus, will be positioned to one side of the support wheel and generally substantially in line with the center of gravity of the apparatus during normal use of the apparatus.

36. A clearing apparatus according to claim 33 in which the guide handle and control handle are positioned so that an operator grasping these handles to operate the apparatus will be positioned to one side of the support wheel and will be generally in line with the support wheel axis during normal use of the apparatus.

37. A clearing apparatus according to claim 33, which is in the form of a trimmer apparatus, in which the clearing device is in the form of a trimmer device for trimming vegetation, and in which the clearing head is in the form of a cutter head for trimming vegetation.

38. A carriage for supporting a trimmer device of the type having an elongated support tube, a cutter head mounted at one end of the elongated support tube for trimming vegetation, a motor mounted at the other end of the elongated support tube, and a drive shaft connecting the cutter head to the motor;
   the carriage comprising a frame and a single support wheel rotatably mounted on the frame to support the frame;
   the frame having a mounting bracket for mounting an elongated support tube of such a trimmer device on the frame, for the support wheel to support the frame and such a mounted trimmer device proximate the net center of gravity of the frame and such a mounted trimmer device;
   and the frame having a handle to be grasped by an operator for guiding the carriage during use, the handle comprising a guide handle which is positioned on a leading side of the net center of gravity of the frame and such a mounted trimmer device so that an operator grasping the guide handle to guide the carriage during use will be positioned to one side of the support wheel and substantially in line with part of an axial projection of the support wheel during use.

39. A carriage according to claim 38, in which the handle further comprises a control handle positioned on the trailing side of the said center of gravity.

40. A carriage for supporting a clearing device of the type having an elongated support member, a clearing head mounted at one end of the elongated support member, a power unit mounted at the other end of the elongated support member, and a power connection connecting the power unit to the clearing head;
   the carriage comprising a frame and a single support wheel rotatably mounted on the frame to support the frame;
   the frame having a mounting bracket for mounting an elongated support tube of such a clearing device on the frame, for the support wheel to support the frame and such a mounted clearing device proximate the net center of gravity of the frame and such a mounted clearing device;
   and the frame having a handle to be grasped by an operator for guiding the carriage during use, the handle comprising a guide handle which is positioned on a leading side of the net center of gravity of the frame and such a mounted clearing device so that an operator grasping the guide handle to guide the carriage during use will be positioned to one side of the support wheel and substantially in line with part of an axial projection of the support wheel during use.

41. A blower apparatus comprising a blower device for use in clearing operations, and a carriage for supporting the blower device during use, the blower device having a body part comprising a motor and a blower head and having a blower tube extending from the blower head, and the carriage comprising a frame, a single support wheel rotatably mounted on the frame to support the frame, and a guide handle for use in guiding the apparatus, and the blower device being mounted on the frame such that the blower apparatus will be supported proximate its center of gravity on the support wheel during use, the guide handle being positioned on a leading side of the center of gravity of the apparatus so that an operator grasping the guide handle will be positioned to one side of the support wheel and substantially in line with part of an axial projection of the support wheel during use.

42. A blower apparatus according to claim 41, in which the support wheel is mounted on the frame so that the wheel will be inclined to the vertical during use with the center of gravity of the apparatus substantially above the contact area of the wheel with the ground during use.

43. A blower apparatus according to claim 42, in which the support wheel has an axle which is off-set to one side to define a space on the opposed side of the wheel to accommodate a portion of the blower device.

44. A blower apparatus according to claim 43 in which the support wheel is dished to one side to define a space on the opposed side of the wheel to accommodate a portion of the blower device.

45. A vacuum apparatus comprising a vacuum device for use in clearing operations, and a carriage for supporting the vacuum device during use, the vacuum device having a body part comprising a motor and a vacuum head, having a vacuum container mounted on the carriage, the vacuum container having a suction flange connected to an intake of the vacuum head, and having a suction nozzle leading to the vacuum container, and the carriage comprising a frame, a single support wheel rotatably mounted on the frame to support the frame, and a guide handle for use in guiding the apparatus, and the vacuum device being mounted on the frame such that the vacuum apparatus will be supported proximate its center of gravity on the support wheel during use, the guide handle being positioned on a leading side of the center of gravity of the apparatus so that an operator grasping the guide handle will be positioned to one side of the support wheel and substantially in line with part of an axial projection of the support wheel during use.

46. A clearing device according to claim 1, in which the elongated support member is mounted to the carriage in a zone between the axis and the periphery of the support wheel.

47. A clearing device according to claim 46, in which the elongated support member has an intermediate portion to extend substantially horizontally during use, has a leading portion which is bent downwardly at an acute angle to the intermediate portion, and has a trailing portion which is bent sidewardly at an acute angle to the intermediate portion.

48. A carriage according to claim 40, in which the handle further comprises a control handle positioned on the trailing side of the said center of gravity.

* * * * *